United States Patent [19]

Ning et al.

[11] 3,925,358
[45] Dec. 9, 1975

[54] 1-LOWER ALKYL-2-SUBSTITUTED-1,4-BENZODIAZEPINES

[75] Inventors: Robert Ye-Fong Ning, West Caldwell; Morton A. Schwartz, Caldwell, both of N.J.

[73] Assignee: Hoffmann-La Roche Inc., Nutley, N.J.

[22] Filed: July 27, 1973

[21] Appl. No.: 383,228

[52] U.S. Cl. ............................ 260/239 BD; 424/244
[51] Int. Cl.² ......................................... C07D 243/16
[58] Field of Search ............................. 260/239 BD

[56] References Cited
UNITED STATES PATENTS 3,481,921  12/1969  Field et al. .................. 260/239 BD

OTHER PUBLICATIONS

Hickenbottom, Reactions of Organic Compounds, (Longmans, Green and Co., London, 1948), page 249 QD251H6.

Sternbach et al., Reprint from "Symposium on CNS Drugs," Held New Delhi, India, 1966, Pages 11–17.

Primary Examiner—Alton D. Rollins
Attorney, Agent, or Firm—Samuel L. Welt; Bernard S. Leon; Frank P. Hoffman

[57] ABSTRACT

Novel 1-lower alkyl-1,4-benzodiazepines bearing in the 2-position a cyano, carboxamido, or lower alkoxyimino group are disclosed. These novel benzodiazepine derivatives are useful as muscle relaxant, anticonvulsant and sedative agents.

8 Claims, No Drawings

1-LOWER ALKYL-2-SUBSTITUTED-1,4-BENZODIAZEPINES

DETAILED DESCRIPTION OF THE INVENTION

The present invention relates to 2-substituted-1,4-benzodiazepines. More particularly, this invention covers 1-lower alkyl-1,4-benzodiazepines substituted in the 2-position with a cyano, carboxamido or lower alkoxy-imino group. This invention further comprehends processes for making these novel benzodiazepines.

More specifically, the compounds of the present invention are selected from the group consisting of compounds of the formula

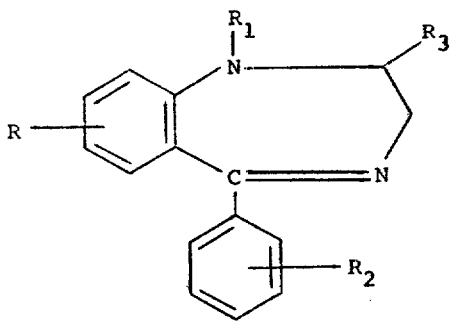

I wherein R is selected from the group consisting of hydrogen, halogen, lower alkyl, trifluoromethyl, nitro, cyano, lower alkoxy and lower alkylthio; $R_1$ signifies lower alkyl; $R_2$ signifies hydrogen or halogen; and $R_3$ signifies cyano, carboxamido or lower alkoxyimino and the pharmaceutically acceptable acid addition salts thereof.

As used herein, the term "lower alkyl" either alone or in combination refers to straight and branched chain hydrocarbon groups containing from 1 to 7, preferably from 1 to 4, carbon atoms, such as, for example, methyl, ethyl, propyl, isopropyl, isobutyl, butyl and the like. The term "halogen" refers to all four forms thereof, i.e., bromine, chlorine, fluorine and iodine. The term "lower alkoxy" designates straight or branched chain hydrocarbonoxy groups containing from 1 to 7 carbon atoms, preferably from 1 to 4 carbon atoms, such as methoxy, ethoxy, propoxy and the like.

A preferred class of compounds falling within the scope of formula I above are those wherein R signifies hydrogen or halogen and is located in the 7-position of the benzodiazepine moiety; and $R_2$ is hydrogen or halogen and is located at the ortho-position of the 5-phenyl ring, i.e., compounds of the formula

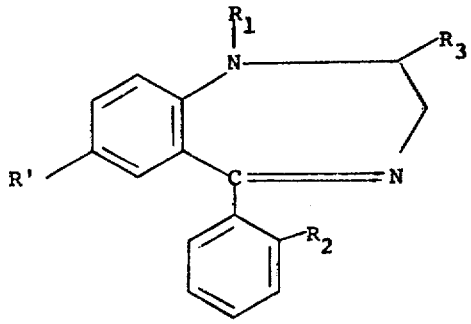

Ia wherein R' signifies hydrogen, halogen, or nitro and $R_1$ through $R_3$ are as described above and the pharmaceutically acceptable acid addition salts thereof.

When the R substituent in the compounds of formula I above is halogen, chlorine is preferred; whereas, when the $R_2$ substituent is halogen, chlorine and fluorine are preferred. The preferred lower alkyl group for the $R_1$ substituent is a methyl group.

Another preferred class of compounds falling with the scope of formula I above are those wherein $R_3$ signifies cyano, i.e., compounds of the formula

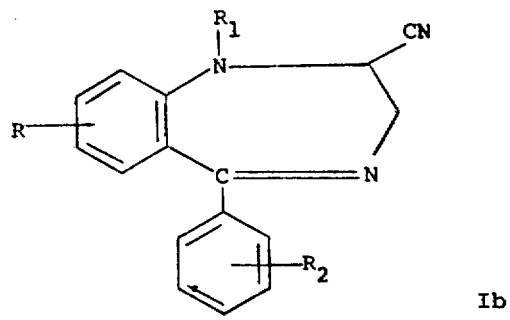

Ib wherein R, $R_1$ and $R_2$ are as described above.

A further preferred class of compounds within the scope of formula I above are those wherein $R_3$ signifies carboxamido, i.e., compounds of the formula

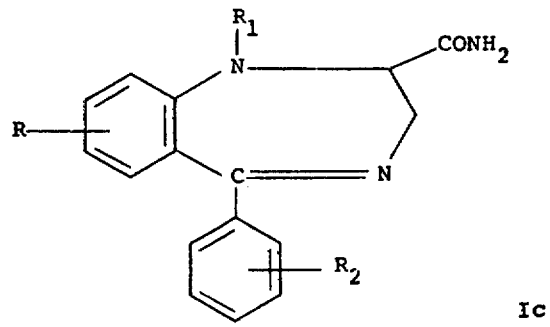

Ic wherein R, $R_1$ and $R_2$ are as described above.

Another preferred class of compounds within the scope of formula I above are those wherein $R_3$ signifies a lower alkoxy-imino group, i.e., compounds of the formula

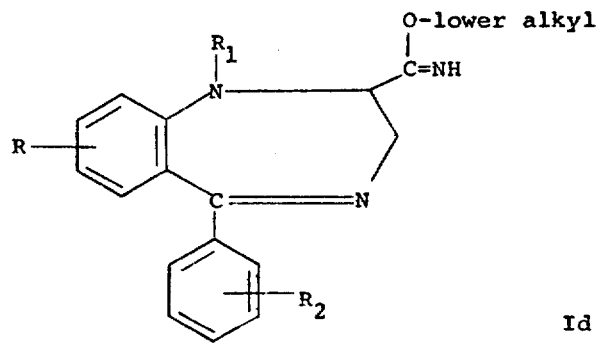

Id wherein R, $R_1$ and $R_2$ are as described above.

The most preferred of the compounds of formula I above are 7-chloro-2-cyano-2,3-dihydro-1-methyl-5-phenyl-1H-1,4-benzodiazepine; 7-chloro-2-cyano-2,3-dihydro-5-(2-fluorophenyl)-1-methyl-1H-1,4-benzodiazepine; 2-carbamoyl-7-chloro-2,3-dihydro-1-methyl-5-phenyl-1H-1,4-benzodiazepine; and 7- chloro-2,3-dihydro-2-(1-imino-1-methoxymethyl)-1-methyl-5-phenyl-1H-1,4-benzodiazepine.

The compounds of formula I above are prepared following a variety of synthetic approaches. In one such approach, the compounds of formula I wherein $R_3$ signifies a cyano group, i.e., the compounds of formula Ib above, are prepared via the cyanation of the corresponding 2-hydroxy-benzodiazepine of the formula

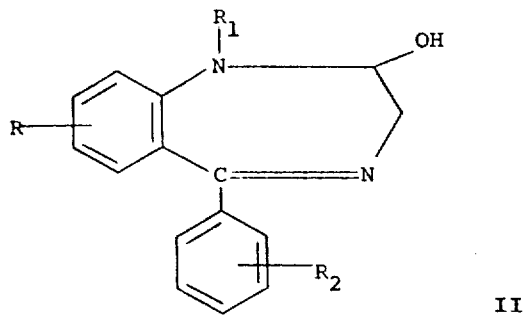

wherein R, $R_1$ and $R_2$ are as described above.

The conversion of the compound of formula II to the 2-cyano derivative of formula Ib may be accomplished by treating said compound with any reagent that generates HCN in the reaction mixture. Thus, the compound of formula II may be treated with an aqueous mixture of an alkali metal cyanide, such as potassium cyanide or sodium cyanide, and glacial acetic acid in a suitable solvent. Suitable solvents include inert organic solvents, such as ether, for example, tetrahydrofuran; dioxane; halogenated hydrocarbons, such as methylene chloride, chloroform and the like. Temperature is not critical to this process aspect and consequently this cyanation reaction is preferably effected at room temperature.

Alternatively, the 2-hydroxy compound of formula II can be converted to the compound of formula Ib by reacting said compound with a cyanohydrin, for example, acetone cyanohydrin. In this reaction, the cyanohydrin reagent also serves as the solvent system. When a cyanohydrin is used as the cyanating agent, this reaction is expediently effected at elevated temperatures, preferably at a temperature in the range of from about 80°–100°C. Since, as indicated above, the cyanation of the 2-hydroxy compound is accomplished by a reagent that generates HCN in the reaction medium, the conversion of the compound of formula II to the 2-cyano derivative of formula IB can also be accomplished by adding HCN to a solution of the formula II compound.

The so-obtained compound of formula Ib can then be used as the starting material for the corresponding compound of formula I wherein $R_3$ signifies carboxamido, i.e., a compound of formula Ic. The conversion of the cyano group in the 2-position to the carboxamido group in the 2-position can be accomplished by treating the 2-cyano compound with either an acid or a base. If this conversion is effected by acid treatment of the 2-cyano derivative, an aqueous mineral acid, such as hydrochloric acid or sulfuric acid, is employed. It is preferred that the concentration of the acid reagent be between 5 and 15N. In this case, the aqueous mineral acid reagent also serves as the solvent system. This reaction is preferably effected at elevated temperatures, most preferably at about 100°C.

As indicated above, the conversion of the 2-cyano derivative to the corresponding 2-carboxamido derivative can also be effected by treating the 2-cyano compound with a base. Suitable bases for this purpose include alkali metal hydroxides, such as sodium hydroxide and potassium hydroxide. This reaction is preferably effected in the presence of an inert organic solvent. Suitable solvents include lower alkanols such as methanol, ethanol, propanol and the like. It is expedient to effect this reaction at elevated temperatures, with the reflux temperature of the reaction medium being preferred.

The 2-cyano-benzodiazepine derivatives of formula Ib prepared as described above can also serve as the starting material for the preparation of the compound of formula I wherein $R_3$ signifies a lower alkoxy imino group, i.e., compounds of formula Id above. The conversion of the 2-cyano derivative to the imino ether of formula Id is effected by treating the starting material with an alkali metal cyanide, such as sodium or potassium cyanide, in the presence of a lower alkanol, such as methanol, ethanol, propanol and the like. As is evident from the course of this reaction, the lower alkoxy group in the end product of formula Id is contributed by the lower alkanol reagent. Thus, if a methoxy group is desired in the end product, methanol is used in the reaction. The lower alkanol reagent also serves as the solvent system for this reaction. It is expedient to effect this reaction at an elevated temperature, preferably by heating the reaction medium at about 100°C.

The compounds of formula I above form pharmaceutically acceptable acid addition salts with inorganic and organic acids. Thus the compounds of the present invention form pharmaceutically acceptable acid addition salts with inorganic acids such as the hydrohalic acids, for example, hydrochloric acid and hydrobromic acid, and with organic acids such as tartaric acid, citric acid, camphor sulfonic acid, ethane sulfonic acid, toluene sulfonic acid, salicylic acid, ascorbic acid, maleic acid, succinic acid, formic acid, acetic acid and the like.

The compounds of formula I above as well as their pharmaceutically acceptable acid addition salts are useful as anticonvulsants, muscle relaxants and sedatives. Thus these compounds and their pharmaceutically acceptable salts can be used as medicaments. For example, they can be used in the form of pharmaceutical preparations which contain them or their salts in admixture with a pharmaceutical organic or inorganic carrier material which is suitable for enteral or parenteral application, such as, for example, water, gelatin, lactose, starches, magnesium stearate, talc, vegetable oils, gum arabic, polyalkylene glycols, vaseline, etc. The pharmaceutical preparations can be prepared in solid form (e.g., as tablets, dragees, suppositories, capsules) or in liquid form (e.g., as solutions, suspensions or emulsions). They may be sterilized and/or contain additives such as preserving, stabilizing, wetting or emulsifying agents, salts for varying the osmotic pressure or buffers. They can also contain other therapeutically valuable substances.

The compounds of formula I above or their pharmaceutically acceptable salts can be administered at dosages adjusted to individual requirements and fitted to the pharmaceutical exigencies of the situation. Convenient pharmaceutical dosages are in the range of from about 2 mg. to about 200 mg. per day.

The useful anticonvulsant activity of the compounds of this invention is shown in warm blooded animals utilizing the standard antimetrazole test. This test was carried out according to the method of Everett and Richard (*J.P.E.T.*, 81: 402, 1944). The $ED_{50}$ was calculated as the dose which would prevent convulsions in 50 percent of the mice tested after administration of 125 mg./kg. of pentylenetetrazole by the subcutaneous route. Following these test procedures compounds such as: 7-chloro-2-cyano-2,3-dihydro-1-methyl-5-phenyl-1H-1,4-benzodiazepine (Compound A) and 2-carbamoyl-7-chloro-2,3-dihydro-1-methyl-5-phenyl-1H-1,4-benzodiazepine (Compound B) show an $ED_{50}$ of 2.1 ± 0.15 and 3.15 ± 0.77 respectively, indicating that these compounds exhibit anticonvulsant activity.

The sedative and muscle relaxant activity of the compounds of the invention are shown using the standard foot shock test. In this test a pair of mice is confined under a 1 liter beaker placed on a grid which presents shock to the feet. At least five fighting episodes are elicited in a 2-minute period. Pairs of mice are marked and pretreated 1 hour prior to a second shock. Logorithmic dose intervals are utilized up to a maximum of 10 mg/kg. At the 100 percent blocking dose 3 out of 3 pairs must be blocked from fighting. The measurements are made at the dose level at which 100 percent blocking is observed and the results are expressed as the dose in mg/kg ($PD_{50}$) which blocks the fighting response for 1 hour. Following these test procdures, Compound A exhibited a $PD_{50}$ of 6.25 mg/kg, Compound B exhibited a $PD_{50}$ of 10.0 mg/kg and 7-chloro-2,3-dihydro-2-(1-imino-1-methoxymethyl)-1-methyl-5-phenyl-1H-1,4-benzodiazepine (Compound C) exhibited a $PD_{50}$ of 20 mg/kg, indicating that these compounds exhibit sedative and muscle relaxant activity.

The following examples are illustrative of the present invention. All temperatures are given in degrees Centigrade.

EXAMPLE 1

Preparation of
7-chloro-2-cyano-2,3-dihydro-1-methyl-5-phenyl-1H-1,4-benzodiazepine A. A solution of 2.50 g of 7-chloro-2,3-dihydro-2-hydroxy-1-methyl-5-phenyl-1H-1,4-benzodiazepine in 16 ml of acetone cyanohydrin was heated on a steam bath for 20 min. The solution was concentrated (water aspirator, 70°–90°, 15 min) to near dryness. The residual gum was purified by preparative thin-layer chromatography (20 20 cm × 20 cm × 2 mm silica gel plates) using benzene containing 10 percent by volume of ether as eluent. The major product (Rf 0.25) was isolated as 1.60 g of a yellow gum which solidified on standing. Recrystallization from methanol afforded the above-named product as yellow prisms, mp 120°–122°.

B. A mixture of 20.00 g (0.070 mole) of 7-chloro-2,3-dihydro-2-hydroxy-1-methyl-5-phenyl-1H-1,4-benzodiazepine, 10.50 g (0.210 mole) of sodium cyanide in 50 ml of water, 400 ml of tetrahydrofuran and 120 ml of glacial acetic acid was stirred at room temperature for ½ hour. This mixture was then neutralized with 10 M sodium hydroxide to pH 8. The tetrahydrofuran layer was separated and evaporated. The residue was partitioned between methylene chloride and water. The methylene chloride layer was dried over anhydrous sodium sulfate and evaporated to dryness. The residual deep orange oil (23.00 g) was dissolved in 50 ml of benzene and was applied to a column of 600 g of silica gel, packed in benzene, and then eluted with 10 percent ether-benzene. The initial 1.5 l. of effluent which contained by-products was discarded. The next 4.50 l. of effluent was evaporated to dryness. The residue on crystallization from methanol yielded the above-named product as straw prisms, mp 121°–122°.

EXAMPLE 2

Preparation of
7-chloro-2-cyano-2,3-dihydro-5-(2-fluorophenyl)-1-methyl-1H-1,4-benzodiazepine A suspension of 0.65 g (2.1 mmoles) of 7-chloro-2,3-dihydro-5-(2-fluorophenyl)-2-hydroxy-1-methyl-1H-1,4-benzodiazepine in 3 ml of acetone cyanohydrin was heated on a steam bath until a maroon solution formed (5 min). The solution was conncentrated to near dryness (water aspirator, 70°–90°, 15 min). The residual gum was purified by preparative thin-layer chromatography (seven 20 cm × 20 cm × 2 mm silica gel plates) using benzene containing 10 percent by volume of ether as eluent. The major product (Rf 0.25, appearing colorless and fluorescent on silica gel) was isolated as a light yellow gum. Crystallization of this gum by allowing the solution in methanol to evaporate slowly afforded the above-named product as colorless prisms, mp 124°–125°.

EXAMPLE 3

Preparation of
2-carbamoyl-7-chloro-2,3-dihydro-1-methyl-5-phenyl-1H-1,4-benzodiazepine A. A mixture of 1.50 g (5.0 mmole) of 7-chloro-2-cyano-2,3-dihydro-1-methyl-5-phenyl-1H-1,4-benzodiazepine, and 7.0 ml of concentrated hydrochloric acid was heated on a steam bath for ½ hour.

The solution was poured into 100 ml of ice water in which was dissolved 10.60 g of sodium carbonate. The desired product was extracted into methylene chloride. The methylene chloride layer was dried over anhydrous sodium sulfate and evaporated to dryness. The residual oil on crystallization from ether yielded the above-named product as a light yellow amorphous solid, mp 202°–204°.

An analytical sample was prepared by recrystallization from methanol to yield light yellow prisms, mp 204°–206°.

B. A mixture of 150 mg (0.50 mmole) of 7-chloro-2-cyano-2,3-dihydro-1-methyl-5-phenyl-1H-1,4-benzodiazepine and 5.0 ml of methanolic sodium hydroxide (2.50 M) was heated to reflux for 1 hr.

The mixture was poured into ice-water and the precipitated product was extracted with methylene chloride. The methylene chloride layer was dried over anhydrous sodium sulfate and then evaporated to dryness. The residual oil on crystallization from ether yielded the above-named product as a light yellow solid, mp 202°–204°.

EXAMPLE 4

Preparation of
7-chloro-2,3-dihydro-2-(1-imino-1-methoxy-methyl)-1-methyl-5-phenyl-1H-1,4-benzodiazepine A mixture of 295 mg (1.0 mmole) of 7-chloro-2-cyano-2,3-dihydro-1-methyl-5-phenyl-1H-1,4-benzodiazepine, 330 mg (5.0 mmole) of potassium cyanide and 25 ml of methanol was heated to reflux for 24 hr. On cooling the mixture was evaporated to dryness. The residue was partitioned between methylene chloride and water. The methylene chloride layer was dried over anhydrous sodium sulfate then evaporated to dryness. The residual oily mixture was separated by preparative thin-layer chromatography (three 20 cm × 20 cm × 2 mm silica gel plates, developed in ethyl acetate). Unreacted starting material (150 mg; Rf 0.74) was recovered. The band at Rf 0.2 yielded the above-named product as an oil which crystallized from ether in a light yellow amorphous form, mp 142°–144°.

EXAMPLE 5

Capsule Formulation

|  | Per Capsule |
|---|---|
| 7-chloro-2-cyano-2,3-dihydro-1-methyl-5-phenyl-1H-1,4-benzodiazepine | 50 mg |
| Lactose, USP | 125 mg |
| Corn Starch, USP | 30 mg |
| Talc, USP | 5 mg |
| Total Weight | 210 mg |

Procedure:
1. The drug was mixed with lactose and corn starch in a suitable mixer.
2. The mixture was further blended by passing through a Fitzpatrick Comminuting machine with a No. 1A screen with knives forward.
3. The blended powder was returned to the mixer, the talc added and blended thoroughly.
4. The mixture was filled into No. 4 hard shell gelatin capsules on a Parke Davis capsulating machine.

EXAMPLE 6

Capsule Formulation

|  | Per Capsule |
|---|---|
| 7-chloro-2-cyano-2,3-dihydro-1-methyl-5-phenyl-1H-1,4-benzodiazepine | 10 mg |
| Lactose | 158 mg |
| Corn Starch | 37 mg |
| Talc | 5 mg |
| Total Weight | 210 mg |

Procedure:
1. The drug was mixed with the lactose and corn starch in a suitable mixer.
2. The mixture was further blended by passing through a Fitzpatrick Comminuting machine with a No. 1A screen with knives forward.
3. The blended powder was returned to the mixer, the talc added and blended thoroughly. The mixture was then filled into No. 4 hard shell gelatin capsules on a Parke Davis capsulating machine. (Any similar type machine may be used).

EXAMPLE 7

Tablet Formulation

|  | Per Tablet |
|---|---|
| 7-chloro-2-cyano-2,3-dihydro-1-methyl-5-phenyl-1H-1,4-benzodiazepine | 25.00 mg |
| Lactose, USP | 64.50 mg |
| Corn Starch | 10.00 mg |
| Magnesium Stearate | 0.50 mg |
| Total Weight | 100.00 mg |

Procedure:
1. The drug was mixed with the lactose, corn starch and magnesium stearate in a suitable mixer.
2. The mixture was further blended by passing through a Fitzpatrick Comminuting machine fittd with a No. 1A screen with knives forward.
3. The mixed powders were slugged on a tablet compressing machine.
4. The slugs were comminuted to a mesh size (No. 16 screen) and mixed well.
5. The tablets were compressed at a tablet weight of 100 mg using tablet punches having a diameter of approximately ¼ inch. (Tablets may be either flat or biconvex and may be scored if desired).

EXAMPLE 8

Tablet Formulation

|  | Per Tablet |
|---|---|
| 7-chloro-2-cyano-2,3-dihydro-1-methyl-5-phenyl-1H-1,4-benzodiazepine | 10.0 mg |
| Lactose | 113.5 mg |
| Corn Starch | 70.5 mg |
| Pregelatinized Corn Starch | 8.0 mg |
| Calcium Stearate | 3.0 mg |
| Total Weight | 205.0 mg |

Procedure:
1. The drug was mixed with the lactose, corn starch and pregelatinized corn starch in a suitable size mixer.
2. The mix was passed through a Fitzpatrick Comminuting machine fitted with No. 1A screen and with knives forward.
3. The mix was returned to the mixer and moistened with water to a thick paste. The moist mass was passed through a No. 12 screen and the moist granules were dried on paper lined trays at 110°F.
4. The dried granules were returned to the mixer, the calcium stearate was added, and mixed well.
5. The granules were compressed at a tablet weight of 200 mg using standard concave punches having a diameter of 5/16 inch.

EXAMPLE 9

The formulations set forth in Examples 5–8 above can also be prepared incorporating as the active ingredient the following compounds:
2-carbamoyl-7-chloro-2,3-dihydro-1-methyl-5-phenyl-1H-1,4-benzodiazepine or 7-chloro-2,3-dihydro-2-(1-imino-1-methoxy-methyl)-1-methyl-5-phenyl-1H-1,4-benzodiazepine.

We claim:
1. A compound of the formula

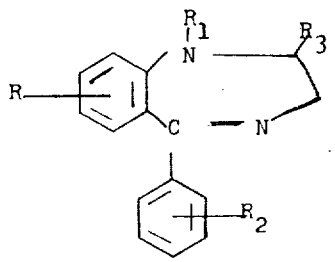

wherein R is selected from the group consisting of hydrogen, halogen, lower alkyl, trifluoromethyl, nitro, cyano, lower alkoxy and lower alkylthio; $R_1$ signifies lower alkyl; $R_2$ signifies hydrogen or halogen; and $R_3$ signifies cyano, carboxamido or lower alkoxyimino
and the pharmaceutically acceptable acid addition salts thereof.

2. A compound of claim 1 wherein $R_3$ signifies cyano.

3. The compound of claim 2 of the formula 7-chloro-2-cyano-2,3-dihydro-1-methyl-5-phenyl-1H-1,4-benzodiazepine.

4. The compound of claim 2 of the formula 7-chloro-2-cyano-2,3-dihydro-5-(2-fluorophenyl)-1-methyl-1H-1,4-benzodiazepine.

5. A compound of claim 1 wherein $R_3$ signifies carboxamido.

6. The compound of claim 5 of the formula 2-carbamoyl-7-chloro-2,3-dihydro-1-methyl-5-phenyl-1H-1,4-benzodiazepine.

7. A compound of claim 1 wherein $R_3$ signifies lower alkoxy imino.

8. The compound of claim 7 of the formula 7-chloro-2,3-dihydro-2-(1-imino-1-methoxymethyl)-1-methyl-5-phenyl-1H-1,4-benzodiazepine.

* * * * *